(12) United States Patent
Middelfart (10) Patent No.: US 7,783,628 B2
(45) Date of Patent: Aug. 24, 2010

(54) METHOD AND USER INTERFACE FOR MAKING A PRESENTATION OF DATA USING META-MORPHING

(75) Inventor: Morten Middelfart, Hjørring (DK)

(73) Assignee: Targit A/S, Hjorring (DK)

( * ) Notice: Subject to any disclaimer, the term of this patent is extended or adjusted under 35 U.S.C. 154(b) by 191 days.

(21) Appl. No.: 10/449,811

(22) Filed: May 29, 2003

(65) Prior Publication Data
US 2004/0230585 A1 Nov. 18, 2004

(30) Foreign Application Priority Data
May 15, 2003 (EP) .................. 03388037

(51) Int. Cl.
*G06F 17/00* (2006.01)
(52) U.S. Cl. ..................... 707/722; 707/803
(58) Field of Classification Search ........... 707/100, 707/3, 4, 104.1, 1, 722, 790, 791, 802, 803; 715/762; 709/200
See application file for complete search history.

(56) References Cited
U.S. PATENT DOCUMENTS

| 4,800,510 | A |   | 1/1989 | Vinberg et al. |  |
|---|---|---|---|---|---|
| 5,611,034 | A |   | 3/1997 | Makita |  |
| 5,692,181 | A | * | 11/1997 | Anand et al. | 707/102 |
| 5,884,302 | A | * | 3/1999 | Ho | 707/3 |
| 5,911,138 | A |   | 6/1999 | Li et al. |  |
| 5,940,818 | A | * | 8/1999 | Malloy et al. | 707/2 |
| 6,108,657 | A |   | 8/2000 | Shoup et al. |  |
| 6,160,549 | A |   | 12/2000 | Touma et al. |  |
| 6,226,647 | B1 |   | 5/2001 | Venkatasubramanian et al. |  |
| 6,415,298 | B1 |   | 7/2002 | Oesterer et al. |  |

(Continued)

FOREIGN PATENT DOCUMENTS

EP          0 961 439          12/1999

(Continued)

OTHER PUBLICATIONS

Aloia, N., "Design of Multimedia Semantic Presentation Templates: Options, Problems and Criteria of Use." Proceedings of the Working Conference on Advanced Visual Interfaces, ACM Press (1998) pp. 205-215.

(Continued)

*Primary Examiner*—Hung T Vy
(74) *Attorney, Agent, or Firm*—Buchanan Ingersoll & Rooney, PC.

(57) ABSTRACT

A computer-implemented method of making a presentation of data requested by a question received via a user interface of a database, wherein data items are categorized as measures or dimensions, and in which question data items of the type measures or dimensions can be associated to specify a set of data; the method comprises the following steps: parsing (301) the question for associations of dimensions and measures, if no association is found, create an association (307); searching (311) for presentation properties of stored associations; if presentation properties are found applying (313) the presentation properties to make a presentation of data specified by the association. Thereby, a user can request a computer presentation of data based on higher or lower levels of abstraction while the computer ensures that a user's preferences are applied.

Additionally, a computer-readable medium, a computer program product and a user-interface is disclosed.

18 Claims, 5 Drawing Sheets

U.S. PATENT DOCUMENTS

| | | | |
|---|---|---|---|
| 6,418,441 B1 | 7/2002 | Call | |
| 6,490,590 B1 | 12/2002 | Fink | |
| 6,615,172 B1* | 9/2003 | Bennett et al. | 704/257 |
| 6,625,617 B2 | 9/2003 | Yarnall et al. | |
| 6,643,635 B2* | 11/2003 | Nwabueze | 707/2 |
| 6,647,363 B2 | 11/2003 | Claassen | |
| 6,671,689 B2 | 12/2003 | Papierniak | |
| 6,775,675 B1* | 8/2004 | Nwabueze et al. | 707/100 |
| 6,816,879 B1* | 11/2004 | Kiritzov et al. | 709/200 |
| 6,873,993 B2 | 3/2005 | Charlesworth et al. | |
| 6,889,230 B1* | 5/2005 | Rogers | 707/104.1 |
| 7,010,523 B2 | 3/2006 | Greenfield et al. | |
| 7,051,038 B1 | 5/2006 | Yeh et al. | |
| 7,103,591 B2* | 9/2006 | Asobayire et al. | 707/3 |
| 7,170,519 B2 | 1/2007 | Patel et al. | |
| 7,171,335 B2* | 1/2007 | Liu et al. | 702/182 |
| 7,209,876 B2* | 4/2007 | Miller et al. | 704/9 |
| 7,293,031 B1 | 11/2007 | Dusker et al. | |
| 2001/0013004 A1 | 8/2001 | Haris et al. | |
| 2002/0038230 A1 | 3/2002 | Chen | |
| 2002/0059183 A1 | 5/2002 | Chen | |
| 2002/0059195 A1 | 5/2002 | Cras et al. | |
| 2002/0062290 A1 | 5/2002 | Ricci | |
| 2002/0070953 A1 | 6/2002 | Barg et al. | |
| 2002/0087516 A1 | 7/2002 | Cras et al. | |
| 2002/0091681 A1* | 7/2002 | Cras et al. | 707/3 |
| 2002/0129004 A1 | 9/2002 | Bassett et al. | |
| 2002/0156714 A1 | 10/2002 | Gatto | |
| 2002/0184024 A1 | 12/2002 | Rorex | |
| 2003/0009295 A1 | 1/2003 | Markowitz et al. | |
| 2003/0050825 A1 | 3/2003 | Gallivan et al. | |
| 2003/0061096 A1 | 3/2003 | Gallivan et al. | |
| 2003/0061358 A1 | 3/2003 | Piazza et al. | |
| 2003/0071814 A1 | 4/2003 | Jou et al. | |
| 2003/0088564 A1 | 5/2003 | Lohmann et al. | |
| 2003/0101119 A1 | 5/2003 | Parsons et al. | |
| 2003/0120593 A1 | 6/2003 | Bansal et al. | |
| 2003/0126136 A1 | 7/2003 | Omoigui | |
| 2003/0158795 A1 | 8/2003 | Markham et al. | |
| 2003/0193502 A1 | 10/2003 | Patel et al. | |
| 2004/0039707 A9 | 2/2004 | Ricci | |
| 2004/0059705 A1 | 3/2004 | Wittke et al. | |
| 2004/0193576 A1 | 9/2004 | Petculescu et al. | |
| 2005/0076045 A1* | 4/2005 | Stenslet et al. | 707/101 |
| 2005/0192931 A1* | 9/2005 | Rogers | 707/1 |
| 2005/0198042 A1 | 9/2005 | Davis | |
| 2005/0210389 A1 | 9/2005 | Middelfart | |
| 2005/0223093 A1 | 10/2005 | Hanson et al. | |
| 2006/0106843 A1 | 5/2006 | Middelfart et al. | |
| 2006/0149407 A1 | 7/2006 | Markham et al. | |
| 2007/0174262 A1 | 7/2007 | Middelfart | |
| 2008/0016035 A1 | 1/2008 | Middelfart | |
| 2008/0301539 A1 | 12/2008 | Middelfart et al. | |
| 2009/0187845 A1 | 7/2009 | Middelfart | |

FOREIGN PATENT DOCUMENTS

| | | |
|---|---|---|
| EP | 1 081 610 A2 | 3/2001 |
| EP | 1 081 611 A2 | 3/2001 |
| EP | 1 477 909 A1 | 11/2004 |
| EP | 1 574 969 A1 | 9/2005 |
| EP | 1 577 808 A1 | 9/2005 |
| EP | 1 659 503 A1 | 5/2006 |
| WO | 82/00726 | 3/1982 |
| WO | WO 97/08604 A2 | 3/1997 |
| WO | WO 01/09780 A1 | 2/2001 |
| WO | WO 01/35256 A2 | 5/2001 |
| WO | WO 01/82135 A1 | 11/2001 |
| WO | WO 2004/102416 A2 | 11/2004 |

OTHER PUBLICATIONS

Mackinlay, J., "Automating the Design of Graphical Presentations of Relational Information", ACM Transactions on Graphics (vol. 5) (No. 2) (1986) pp. 110-141.

Michelle X. Zhou & Sheng Ma, "Representing and Retrieving Visual Presentations for Example-Based Graphics Generation," Proceedings, 1st International Symposium on Smart Graphics, Hawthorne, NY, USA (Mar. 21-23, 2001), pp. 87-94.

Notice of Allowance dated Aug. 12, 2009 from related U.S. Appl. No. 10/556,214.

Notice of Allowance dated Sep. 8, 2009 from related U.S. Appl. No. 10/802,509.

Notice of Allowance dated Sep. 8, 2009 from related U.S. Appl. No. 10/991,302.

Abualsamid, Ahmad. "PHP & Hosted Applications: A flexible scripting language for building dynamic web pages", *Dr. Dobb's Journal* (2001), 26(1): 56, 58, 60-63.

Spiers, Andrew, "Creating Dynamic WBMP images using PH?", WMLScript.com, (Jan. 13, 2001) pp. 1-3.

Royappa, Andrew V. "The PHP Web Application Server" *Journal of Computing in Small Colleges* (2000), 15(3): 201-211.

"L" interface avec une base de données, Université Paris, (Oct. 18, 2000), pp. 1-4, Retrieved from http://web.archive.org/web/20001018225046.

*Internet Archive Wayback Machine* Search Results for "http://margotte.univ. Paris 1.fr/webcurse.html sql.html", Oct. 18, 2000. Retrieved from http://web.archive.org/web.

"Les bases de données relationnelles, Chapitre 25: les échanges de données," (Jan. 3, 2003), pp. 1-6. Retrieved from http://cerig.efpg.inpg.fr/tutoriel/bases-de-donness/chap25.htm.

"Importer Et Exporter Avec Excel, Source No. 3673," *Visual Basic Code Sources*, (Jun. 19, 2002) pp. 1-2. Retrieved from http://www.vbfrance.com/code.aspx?ID = 3673.

Perez, J. M. et al. "A Relevance-Extended Multi-Dimensional Model for a Data Warehouse Contextualized with Documents" DOLAP (2005) p. 19-28.

Form PCT/ISA/210 (International Search Report) dated Dec. 5, 2007, issued in corresponding International Application PCT/DK2007/000232.

Form PCT/ISA/237 (Written Opinion of the International Searching Authority) dated Dec. 5, 2007 issued in corresponding International Application PCT/DK2007/000232.

B. Azvine et al., "Intelligent Process Analytics for CRM", BT Technology Journal, Jan. 2006, vol. 24, No. 1, pp. 60-69, XP-019392378, Kluwer Academic Publishers.

Pawan Chowdhary et al., "Enterprise Integration and Monitoring Solution Using Active Shared Space", Proceedings of the 2005 IEEE International Conference on e-Business Engineering (ICEBE'05), Oct. 12, 2005, pp. 665-672, XP-010860530, The Computer Society.

Russell Barr et al., "Real Time Modeling for Financial and Performance Management", Cement Industry Technical Conference, IEEE, May 15-20, 2005, pp. 43-51, XP-010840065.

Form PCT/ISA/210 (International Search Report) dated Nov. 11, 2004, issued in corresponding International Application PCTDK2004000347.

Office Action dated Mar. 20, 2007 from related U.S. Appl. No. 10/302,509.

Office Action dated Jul. 18, 2006 from related U.S. Appl. No. 10/802,509.

Office Action dated Dec. 11, 2007 from related U.S. Appl. No. 10/802,509.

Office Action dated Dec. 15, 2008 from related U.S. Appl. No. 10/802,509.

Office Action dated Jun. 15, 2009 from related U.S. Appl. No. 10/509,832.

Office Action dated Sep. 19, 2008 from related U.S. Appl. No. 10/509,832.

Office Action dated Feb. 5, 2008 from related U.S. Appl. No. 10/991,302.

Office Action dated Jun. 22, 2007 from related U.S. Appl. No. 10/991,302.
Office Action dated Jun. 22, 2009 from related U.S. Appl. No. 10/991,302.
Office Action dated Oct. 2, 2008 from related U.S. Appl. No. 10/991,302.
Office Action mailed Sep. 23, 2008 from related U.S. Appl. No. 10/556,214.
Office Action dated Dec. 21, 2007 from related U.S. Appl. No. 10/556,214.
EP Search Report dated Dec. 18, 2008 from EP Application No. 07 38 8055 corresponding to U.S. Appl. No. 11/509,832.
Becks, A., "SEWASIE—Specification of the Interface Design" XP002300607, Retrieved from the Internet: URL: http://www.sewasie.org/documents/D-4-4-interface-design.pdf> [retrieved on Oct. 13, 2004].
W. Cody et al., "The Integration of Business Intelligence and Knowledge Management" XP002300608, Retrieved from the Internet: URL: http://www.research.ibm.com/journal/sj/414/cody.pdf> [retrieved on Oct. 13, 2004].
Becks, A., "SEWASIE—Specification of the Architecture of the Monitoring Agent/Visualization Component" XP002300606, Retrieved from the Internet: URL: http://www.sewasie.org/documents/D-4-1-monitoring-agent-architecture.pdf> [retrieved on Oct. 13, 2004].
Communication from European Patent Office dated Jul. 28, 2004 from related EP Application No. 04388019.
Johnson et al., History data facility in the SLC control system, May 6-9, 1991, IEEE, vol. 3, 1540-1542.
Priebe et al., Ontology-based integration of OLAP and information retrieval, Sep. 1-5, 2003, IEEE, 610-614.
Office Action dated Dec. 8, 2009 from related U.S. Appl. No. 11/509,832.
Communication dated Mar. 6, 2009 from related EP Application No. 04 388 077.2 corresponding to U.S. Appl. No. 10/991,302.
Communication dated Sep. 2, 2008 from EP Appl. No. 08 15 5432 corresponding to U.S. Appl. No. 12/112,178.
"MicroStrategy Introduces Next-Generation Dynamic Enterprise Dashboards" Thomasnet Industrial Newsroom, [Online] Jan. 22, 2007, XP002491679 Retrieved from the Internet: URL:http://news.thomasnet.com/fullstory/802157> [retrieved on Feb. 25, 2010].
Technologies4Targeting Ltd.: "Cognos Visualizer—Corporate dashboards that give managers insight to make better decisions" Internet Article, [Online] 2004, XP002491680 Retrieved from the Internet: URL:http://www.tech4t.co.uk/pages/cognos_visualizer.html> [retrieved on Feb. 25, 2010].
Chaudhuri S et al: "An Overview of Data Warehousing and OLAP Technology" Sigmod Record, ACM, New York, NY, US, vol. 26, No. 1, Mar. 1, 1997, pp. 65-74, XP002193792 ISSN: 0163-5808.
Microstrategy Incorporated: "MicroStrategy 8 Frequently Asked Questions (FAQ)" Internet Article, [Online] 2005, XP002491681 Retrieved from the Internet: URL:http://www.firstbi.com.tw/download/8.0%20FAQ.pdf> [retrieved on Feb. 25, 2010].
Communication dated Aug. 10, 2007 from EP Application No. 04 388 077.2 corresponding to U.S. Appl. No. 10/991,302.
Communication dated Oct. 29, 2009 from EP Application No. 04 388 077.2 corresponding to U.S. Appl. No. 10/991,302.

\* cited by examiner

METHOD AND USER INTERFACE FOR MAKING A PRESENTATION OF DATA USING META-MORPHING

This invention relates to a computer-implemented method of making a presentation of data using meta-morphing. A presentation is made based on user preferences.

Data processing for analytical or monitoring/reporting purposes ranging from simple accounting or storage of collected sample values to complex calculations or advanced queries to complex data structures generates results which are presented graphically/visually to a user. Thereby the user is able to interpret the results and make decisions based on them. This may be irrespective of whether they are presented in textual form or in a graph form, and irrespective of whether they are just a brief number of figures or figures in counts of hundreds to thousands.

The graphical/visual presentation of data is greatly influenced by the type of graphical/visual means applied to make the presentation and layout properties of the graphical/visual means. For textual presentations the means may comprise text sections, headings, tables with columns and rows, etc. The layout properties may comprise font size, line spacing, etc. For graphical presentations the means may comprise different types of charts and diagrams such as bar charts, line charts, pie charts, scatter charts, radar diagrams and other known diagrams or charts based on graphical elements. The layout properties may comprise tick marker spacing on an axis, legend font size, etc.

Typically, the presentation means are selected by a user from a so-called 'report generator' or a 'chart wizard', wherefrom default layout properties or user specified layout properties are selected before making the presentation.

Presentation means may be more or less suitable for making a presentation of a specific result with given contents, structure and format. Typically, the user is the only one to make a decision on that since it may require knowledge of the result which is not present in the application wherein the presentation is made. However, the layout properties for specific presentation means are to some extent determined by properties of the physical medium on which the presentation is to be made. These properties are typically known to the application since knowledge of these properties is required to make the presentation. Therefore, the application can to some extent provide automatic setting of the layout properties. However, when it comes to layout properties which clearly are to be set in response to preferences of individual users and which may depend heavily on the content, structure and format of the result, it becomes critical to select a presentation automatically or semi-automatically.

Selecting either automatically or manually presentation properties may consequently degrade the quality of the presentation.

In some types of applications the result has a fixed structure and format which is presented by the same graphical/visual means. Thereby, it may be worth the effort to select the presentation means that gives the best interpretation of the result and select the layout properties that provide the best presentation quality.

However, in other types of applications the results may take different structures and formats which are presented by different graphical/visual means. Thereby, it may be an overwhelming task to select all possible combinations of presentation means and layout properties to be able to capture all different structures and formats which may be subject to a presentation.

Especially, in connection with presentation of results obtained by submitting a query to a database, the query to the database may generate results that can take so many different structures and formats that it may be practically impossible to capture all the combinations of a result for making an automatic or semi-automatic presentation.

The ever increasing data capacity of storage memories and the widespread use of databases increases the amount of time a user is confronted with the task of, on the one hand, making queries to databases; and on the other hand, selecting a presentation for the data retrieved by the query. Actually, data can be retrieved by natural language questions which can be submitted from a user interface and which are subsequently converted to queries that can be interpreted by a database. By using a natural language to subsequently form a query, a user is relieved from the, in this respect, tedious task of making a query requiring exact knowledge of both the structure of the database and the syntax of the query language.

Data can be organised in various types of databases with different data structures. Known structures comprise multi-dimensional databases (e.g. OLAP, OnLine Analytical Processing) and relational databases, flat file databases, XML (Extensible Markup Language) databases, etc. In these databases elements of data can be denoted data items and can be defined as a field in a specific record, a cell in a table or spreadsheet, or a delimiter or tag separated or fixed length data entity.

Despite their different structures each of the data items in the databases can be categorized as being so-called measures or dimensions. From a data representation point of view there are prima facia no difference, but from a user's point of view, a data item of the measures type can be interpreted as a measure value given a specific condition specified by an associated value of a data item of the dimensions type. Hence, for instance a range of data items categorized as measures can represent sales figures in an organisation. These sales figures are given a meaning when associated with the specific conditions of the time instances at which the sales figures represent the sales in the organisation. By categorizing the data items in this way an additional and more abstract way of representing data is provided; this additional representation is also denoted meta-data.

In the prior art several techniques for making presentation of data are disclosed.

U.S. Pat. No. 5,611,034 discloses a method of making a graph by selecting one of a plurality of graph forms that are automatically determined to fit a user's data format. Thereby graph forms that are deduced to be inappropriate for displaying selected data can be filtered out to make a list of appropriate graphs. For instance the method can filter out a pie chart if a user's data format involves several rows and columns. However, this method is only involved with deductions that are based on low level, logic deductions.

WO 82/00726 discloses a mechanism for generating graphic charts based on a user interface wherefrom a user can create new charts or recall previously created charts. The mechanism involves a selector mechanism which co-operates with the user interface to provide a set of interdependent and sequential menus which in combination provides guidance for the user in the process of composing a chart. The chart is created in a user selected input mode from user selected chart objects and descriptors of the chart objects. Hence, the user is provided with a wizard-like guidance wherefrom also previously created charts may be selected and recalled. The user however, must struggle to remember which chart to select and recall.

U.S. Pat. No. 6,160,549 discloses a report generator that uses a graphical user interface to facilitate specification of layout aspects of the report and data aspects of the report. The report generator allows the use of multiple database queries that are related to each other in a parent-child relationship in a tree hierarchy. Each node of the tree describes a layout object with layout properties and introduces a relation between the report layout and data. The layout properties are defined by a user by means of a graphical user interface. Thereby the task of procedural or declarative report programming is limited or avoided in report development. Despite being able to reuse previously specified presentation elements combined with a previously used query element when the query element is used again, it may be desired to alter the presentation element when used in a new query/presentation context. Thereby reuse of presentation element as in the original context is spoiled.

U.S. Pat. No. 4,800,510 discloses a method for controlling the process of designing the layout of a computer-generated graph by automatically adjustment of design parameters that determines the layout of the graph in response to user selected parameters that are selected at a higher level of abstraction of the computer-generated graph. This. is carried into effect by referencing each group of multiple design parameters by a single user selectable parameter.

As shown above, the prior art discloses various techniques for easing the task of setting up the layout of a presentation in the form of a graphical report or a graph. At a relatively high abstraction level the user is involved in selecting the presentation, whereas at lower abstraction levels, involving more details, a system automatically generates the presentation. The automatically generated presentation is generated from previously stored preferences on previous presentations or knowledge of the data or the queries that are used for retrieving the data to be presented.

Despite being involved with the queries that generate data to be presented, thereby gaining knowledge of the meta-data which describes the data to be presented, the prior art is not involved with retrieving previously stored presentation properties, in the sense of generating a presentation, at a sufficiently high level of aid to the user requesting a presentation.

More specifically, the prior art is not concerned with meta-morphing in which queries can be formulated on a very high level of abstraction and, additionally, on a lower level of abstraction.

The present invention overcomes this and other problems by means of a computer-implemented method of making a presentation of data requested by a question received via a user interface of a database, where data items are categorized as measures or dimensions, and in which question data items of the type measures or dimensions can be associated to specify a set of data. The method comprises the following steps: parsing the question for associations of dimensions and measures to determine an association; searching for presentation properties of stored like associations, determining whether presentation properties are found, and in the affirmative event, applying the presentation properties to make a presentation of data specified by the association.

Thereby, meta-data can be used making deductions about which presentation to select when using an automatic selection procedure. The question can be a natural language question in which a named data item of the measures type is associated with a named data item of the dimensions type. The association can be stated by use of a reserved word such as the word 'by' or by use of another more or less simple syntax. Hence, a question could be "I would like to see sales by country". Knowing that 'sales' is a data item of the measures type and that 'country' is of the dimensions type parsing the question for associations of dimensions and measures associated by the word 'by' results in an association being determined. In case the question was: "I would like to see sales" no association would be found in the question, but an association involving the found data item of the measures type and any one of the known dimensions could be created. Based on either the found association or the created association a storage memory of presentation properties for previously used presentations can be searched and if a match is found, these presentation properties can be applied to make a presentation of data specified by the association.

Consequently, meta-knowledge of data items in questions is used for determining presentation properties. Thereby the chance of being able to retrieve presentation properties is greatly increased. Since presentation properties are searched for per association, it is possible to define presentation properties for each new combination of data items or to define several sets of presentation properties per association. Thereby the presentation of e.g. a data item 'sales' may be different depending on the association it is bound to.

Closely related thereto, the invention relates to a computer-implemented method of making a presentation of data retrieved by a query from a question received via a user interface of a database, wherein data items are categorized as measures or dimensions, and in which question data items of the type measures or dimensions can be associated to specify a set of data. The method involves the following steps: determination of an association by parsing the question to detect an association or a data item, if any, and in the event no association is found, searching a first storage to detect a previously used association, if any, involving the data item, and in the event no previously used association involving the data item is found, creating an association involving the data item; determination of presentation properties for a determined association by searching a first storage for presentation properties of a previously stored, like association, and in the event presentation properties of a previously stored, like association is found, applying the presentation properties to make a presentation of the data specified by the association.

In a preferred embodiment, the method comprises the steps of parsing the question to detect combinations of associations, and determining presentation properties by searching stored combinations of associations with assigned presentation properties. Accordingly, presentation properties that are specific for combinations of multiple associations can be stored and applied. This is expedient when a presentation involves multiple graphical presentation means e.g. a pie chart and a bar graph or a pie chart and a table of figures.

Preferably, the method comprises the step of determining whether a data item of the dimensions type or measures types is present in the question, and in the affirmative event selecting a data item of the measures type or the dimensions types, respectively, to create an association. Thereby a user can ask very brief questions while still being provided with a useful presentation.

Preferably the method comprises the step of selecting a data item of the measures type or dimensions type involves selecting from a storage memory the data items that can be associated with the determined data item in the question to create an association. Consequently, a data item of the first type can be associated with all data items of the second type to subsequently allow a user to deselect undesired presentations.

In a preferred embodiment the method comprises the step of selecting a data item of the measures type or dimensions type involves selecting the data items that are determined to be the most frequently used data items of the dimensions type or measures type, respectively. Thereby, a user making presentations of different data items of the type measures most frequently associated with a dimension of 'time' can simply ask a question stating the measure, and according to the method, a presentation of the stated measure can be made, based on existing preferences for a like association, if any.

In a preferred embodiment the method the step of selecting a data item of the measures type involves selecting from a storage memory the data items that are determined to be the most frequently used data items in association with the determined data item in the question. Thereby, the frequency of use in this specific association only counts when selecting a data item of the measures type.

Preferably, the determined associations of data items that are applied with the presentation properties to make a presentation are registered with a count that represents a frequency of use. Thereby, only presentations that are actually made will be assigned counts in the frequency of use. Preferably, the user interface is supplied with controls to change or modify a current presentation. Any such change or modification that results in changed presentation properties will give rise to an event of reassigning the presentation properties to the most recent presentation properties. Thereby, the user's most recent preferences are stored.

In an expedient embodiment, the method comprises creation of a memory object for each determined data item of the dimensions type. Consequently, data and presentation properties for a given graphical presentation means can be handled efficiently.

Since it may be difficult to find a complete match when searching previously used presentations, the determination of presentation properties may comprise a layered search for presentation properties. Thereby, a complete match can be favoured while ensuring that presentation properties are always provided.

Preferably, the layered search comprises a first level with a search for a match of measures and same dimensions.

Additionally, it may be appropriate that the layered search comprises a second level with a search for a match of measures and different dimensions. Thereby, the measure is taken as a cardinal selection.

Additionally, it may be convenient that the layered search comprises a third level with a search for a match of dimension at primarily the same level of dimension or secondarily at a different level of dimension.

Additionally, it may be convenient that that the method comprises the step of applying an expert system, arranged to determine and apply presentation properties, in the event no like association is found.

Moreover, the invention relates to a user interface, a computer readable medium and a computer program product.

A preferred embodiment of the invention will described in connection with the drawing in which.

Figure 1:
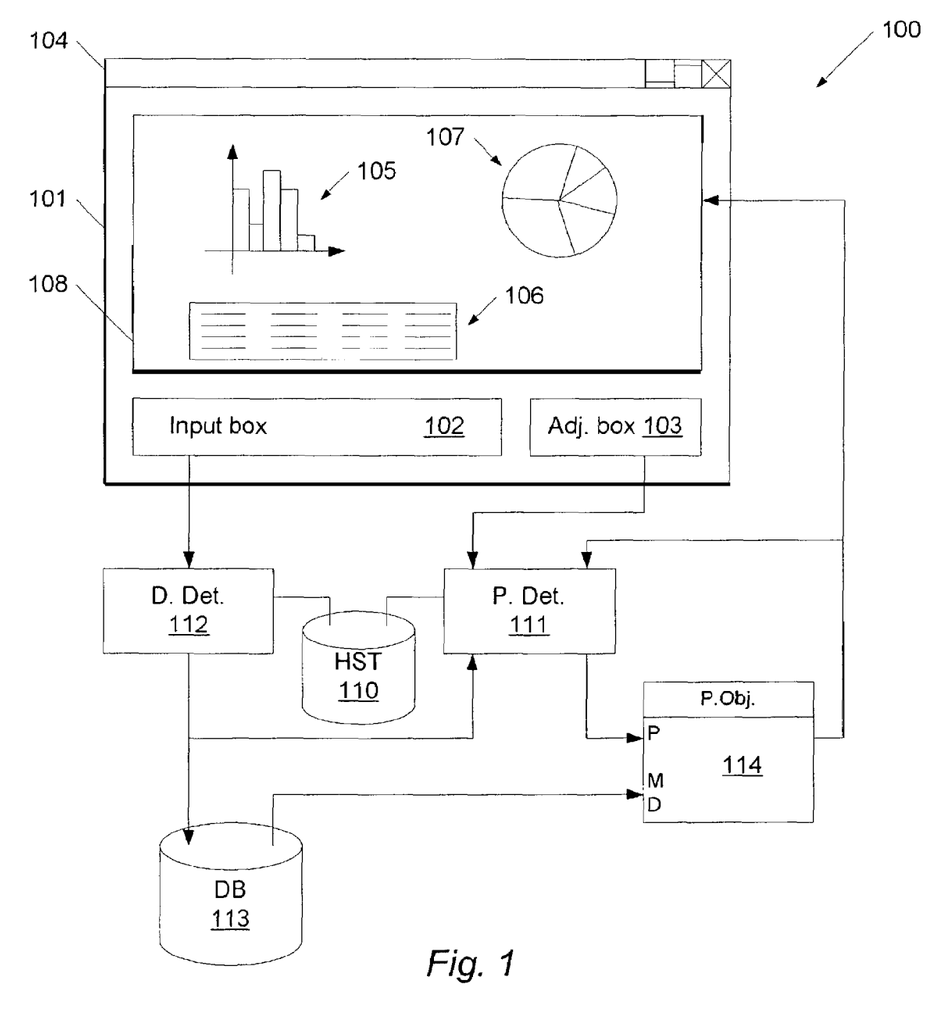
FIG. 1 shows a first block diagram of a system according to the invention.

FIG. 1 shows a first block diagram of a system according to the invention. The system 100 comprises a user interface 101 which operates in combination with a data determination component 112, a database 113, a presentation determination component 111, a storage memory 110, and a presentation memory object 114.

The user interface 101 is shown in the form of a window which has a control bar 104 with controls for closing, minimizing the size of the window and either maximizing the size or restoring the size of the window. The window comprises controls in the form of an input text box 102, an adjustment box 103, and a container 108 in which different graphical presentation objects (105, 106, 107) can be placed. Different presentation objects can be placed in the container, e.g. a bar chart object 105, a pie chart object 107, and a list object 106.

By means of the input text box a user can write a question in a natural language in a preferred language e.g. the English language. From a user's perspective this question constitutes a query the database 113. In an exemplary embodiment the database can contain the following data items, wherein the date items are categorized as measures and dimensions and wherein a dimension exists at different levels such as day, month, and year:

| Measures: | Dimensions: |
|---|---|
| 'turnover' | 'time' (level 0: Year; level 1: Month; level 2: Day) |
| 'cost' | 'Customer' (level 0: Group; level 1: Name) |
| | 'Product' (level 0: group; level 1: Name) |
| | 'Country' |

Thereby the following questions can be asked:
1) I would like to see 'cost' grouped by 'time, month'
2) I would like to see 'turnover' grouped by 'time, month', 'customer, group' and 'product, name'
3) I would like to see 'turnover'
4) I would like to see 'country'

A question like the above ones are forwarded to a data determination unit 112, which is arranged to identify data items and their category and levels by parsing the question. Based on the identified data items, the data determination unit 112 is able to look up a storage memory 110 of previously used combinations of meta-data and presentation properties. The contents of the storage memory 110 can have the following form as shown in table 1:

TABLE 1

| Data | Presentation | Frequency |
|---|---|---|
| Time, Level 1 Turnover | type = Barchart; legend = off; labels = off; 3D-effects = Orthogonal | 3 |
| Country; Contribution Margin | type = map; legend = off; labels = on; 3D-effects = None | 3 |
| Customer, Level 0; Turnover; Cost; Contribution Margin | Type = Crosstab; legend = off; labels = off; 3D-effects = None | 2 |
| . | . | . |
| . | . | . |
| . | . | . |

By searching the storage memory 110, with contents as shown in table 1 above, for a match on the data items and levels identified from the question, it is possible to determine whether a previous presentation matching the question has been used. Thereby preferred presentation properties can be found. If for instance it is determined that a question involves the data item 'time, level 1' and 'turnover', it can be deduced that the preferred presentation of these data items is a bar chart with properties as shown in table 1 above. According to the invention a more detailed description of this deduction will be described in connection with the flowcharts.

Presentation properties are determined by the presentation determining unit 111 based on the result of the search for matching data items and levels. The determined presentation properties are sent to a presentation memory object 114.

The data determining unit 112 converts the question of a query that can be submitted to a database 113 via a database connection. In response to the query, the database provides a result data set. This result data set is sent to a presentation memory object 114. Thereby the result data set and the presentation properties are handled in the same memory object 114.

Via the presentation determining unit 111, the presentation properties from the data object or from the adjustment box 103 can be used for updating the frequency count and/or another update of the storage with the registered combinations of data and presentation properties in storage memory 110. The frequency count and/or another update of the storage can be updated in response to a user changing focus from the container 108 to the input box 102 and/or closing or minimizing the window 104. Alternatively, a button or other control (not shown) on the user interface 101 can be used as an acceptance of storing the presentation properties of the present presentation and/or update the frequency count. In the latter case, a more transparent update is provided.

Presence of controls and/or parameters in the adjustment box 103 can be regulated by registering a frequency of use for the individual controls. Thereby, e.g. the top 4 or 5 most used controls can be adapted to be directly available in a primary box, whereas access to additional less frequently used controls is provided in a secondary box.

In a preferred embodiment, the frequency of use for controls and/or parameters in the adjustment box 103 can be regulated by registering a frequency of use for the individual controls, which frequency of use is specific to the question or data items provided via the input box 102. Thereby, the controls available in a primary box are adapted to correspond both to the data on which the presentation is based and to a user's preferences.

Figure 2:
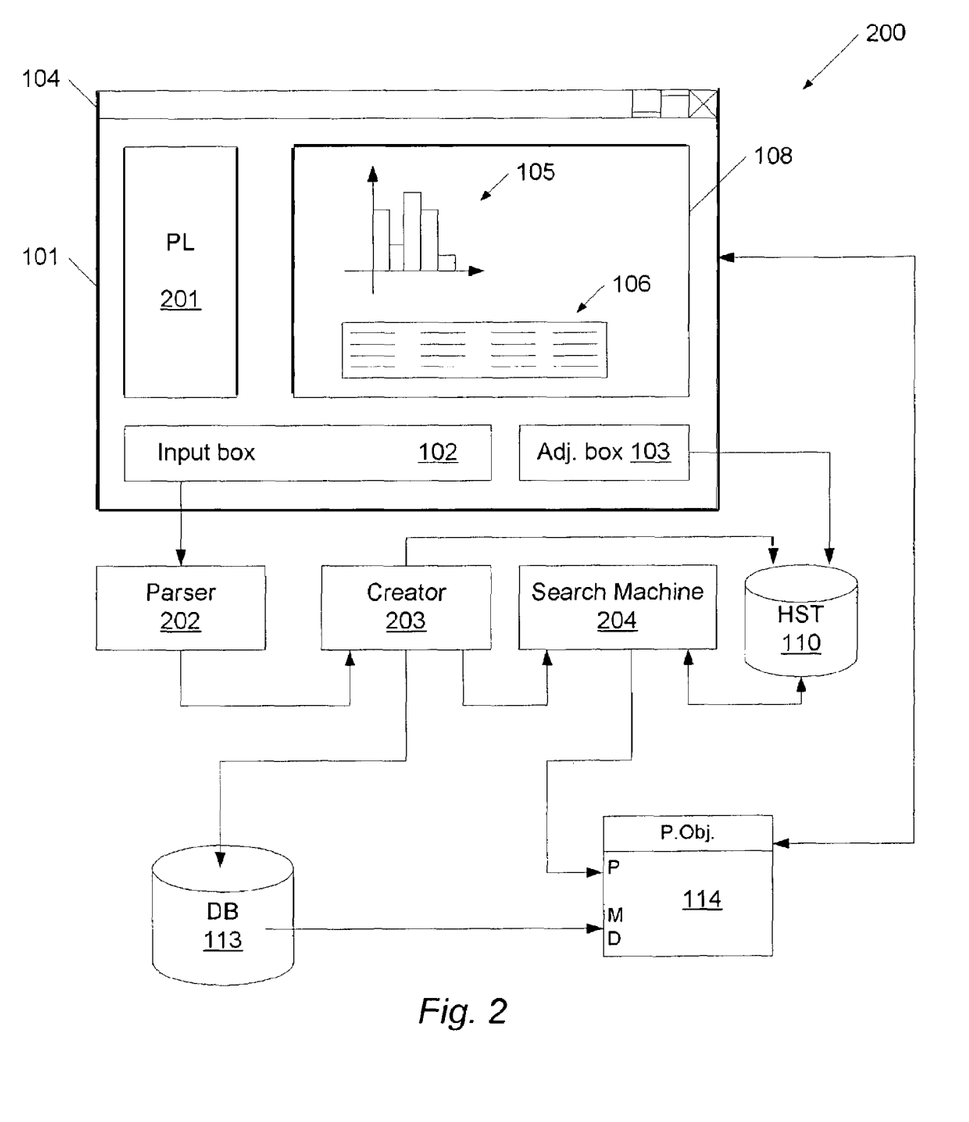
FIG. 2 shows a second block diagram of a system according to the invention.

FIG. 2 shows a second block diagram of a system according to the invention. The system 200 comprises the user interface 101 which operates in combination with a parser 202, the database 113, a creator 203, a search engine 204, the storage memory 110, and the presentation memory object 114.

The creator 202 is arranged to parse an input i.e. a question or query received by means of the input box 102 to identify data items, associations of data items and dimension levels and criteria, if any. Based on the identified items, a creator 203 initiates several operations: sending a query to the database 113; creating an association of data items which association is forwarded to storage memory 110 for immediate or subsequent storage; and forwarding the association to a search engine that searches the storage memory 110 for previously stored like associations. By means of an adjustment box 103 on the user interface 101, presentation properties of a performed presentation is registered and stored in the storage memory 110 with a relation to the association that was used for retrieving the presented data i.e. the one forwarded to the storage memory.

In the shown embodiment, the user interface 101 comprises a pick-list 201 which can contain items that exist in the database. The items can be grouped by e.g. their category (measures or dimensions). A user entering a question in the input box 102 can pick a data item from the pick-list 201 to thereby uniquely identify a data item for a question. Thereby, the user is not required to remember data items of the database. The pick-list 201 can be provided with data items by manually entering them or by automatically retrieving existing data items in the database.

Figure 3:
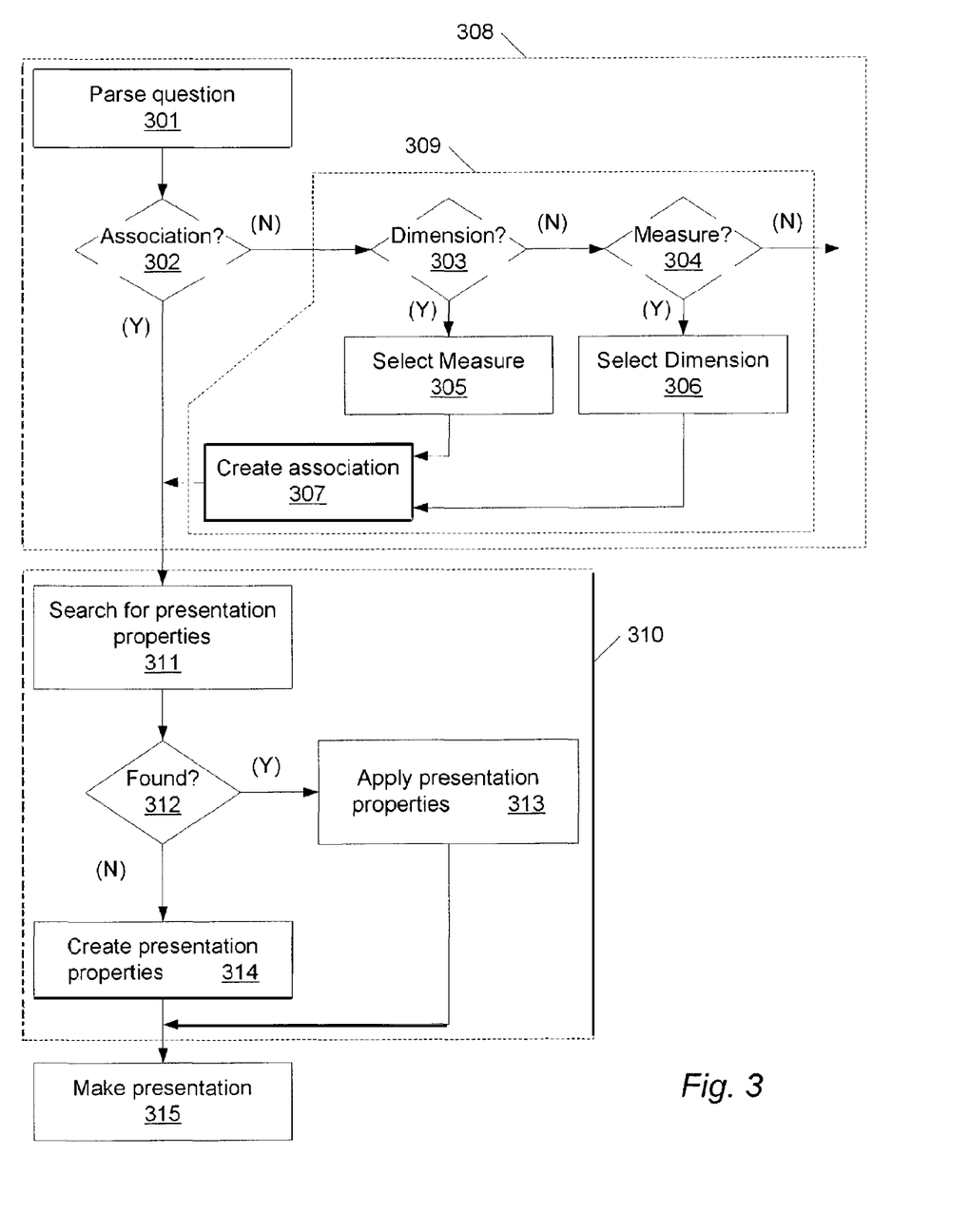
FIG. 3 shows a flowchart of a method according to the invention of determining an association and determining a presentation.

FIG. 3 shows a flowchart of a method according to the invention of determining an association and determining a presentation. The flowchart is divided into a data determining section 308, a presentation determining section 310 and a step 315 of making a presentation based on determined data and presentation properties. In the data determining section 308, a first step 301 is to parse a question received from a user. This step comprises identifying data items and their category and associations of data items, if any. Optionally, the step 301 can comprise identifying dimension levels; criteria, if any; and combinations of associations. In subsequent step 302 it is determined whether any associations were identified. In the positive event (Y) it can prima facia be deduced that sufficient data were present in the question and that a search for presentation properties can be initiated in step 311. In the negative event (N) however, it can be deduced no association is found in the question and according to the invention the method continues in section 309 of the flowchart to create an association. In section 309 it is examined in step 303 whether an identified data item is of the dimensions type. In the positive event (Y) of step 303 a data item of the measures type is selected in step 305. In the negative event (N) of step 303 it is examined in step 304 whether an identified data item is of the measures type; and in the positive event (Y) thereof a data item of the dimensions type is selected in step 306. In case no measure is identified, and consequently no dimension is identified, it can be deduced that the question has not even incomplete information, but is lacking information. In this case the situation can be handled by prompting the user to enter a valid question with at least one data item or alternatively to apply the most frequently used question and therewith applied presentation properties.

In steps 305 and step 306 a previously used association, if any, involving the identified data item may be detected. However, in the event no previously used association involving the data item is found a most frequently used data item can be selected or all data items of the respective type can be selected. An association based on the identified data items and determined data items is created in step 307. This step can involve creating a memory object for each data item of the dimensions type.

If a data item of the measures type or dimensions type has been selected in either step 305 or step 306, respectively, a search for presentation properties can in a storage memory be initiated in step 311. In step 312 it is examined whether a previously used presentation is found. In the positive event (Y) presentation properties of a previously stored, like association is found, the presentation properties are applied in step 313 to make a presentation of the data specified by the association in step 315. Alternatively (N), if no like association is found, presentation properties are created either be selecting the association that is most like an existing association and/or by use of an expert system. Consequently, even a question with incomplete data identification can lead to retrieval and application of preferred presentation properties to make a presentation.

In a preferred embodiment, the method according to the invention can simply parse the question to identify associations, and subsequently proceed directly to step 311 to search for presentation properties. Thereby, presentation properties can be retrieved based on associations identified in the question. Thus the steps 302 and steps in section 309 can be omitted while the method is in accordance with the invention.

Figure 4:
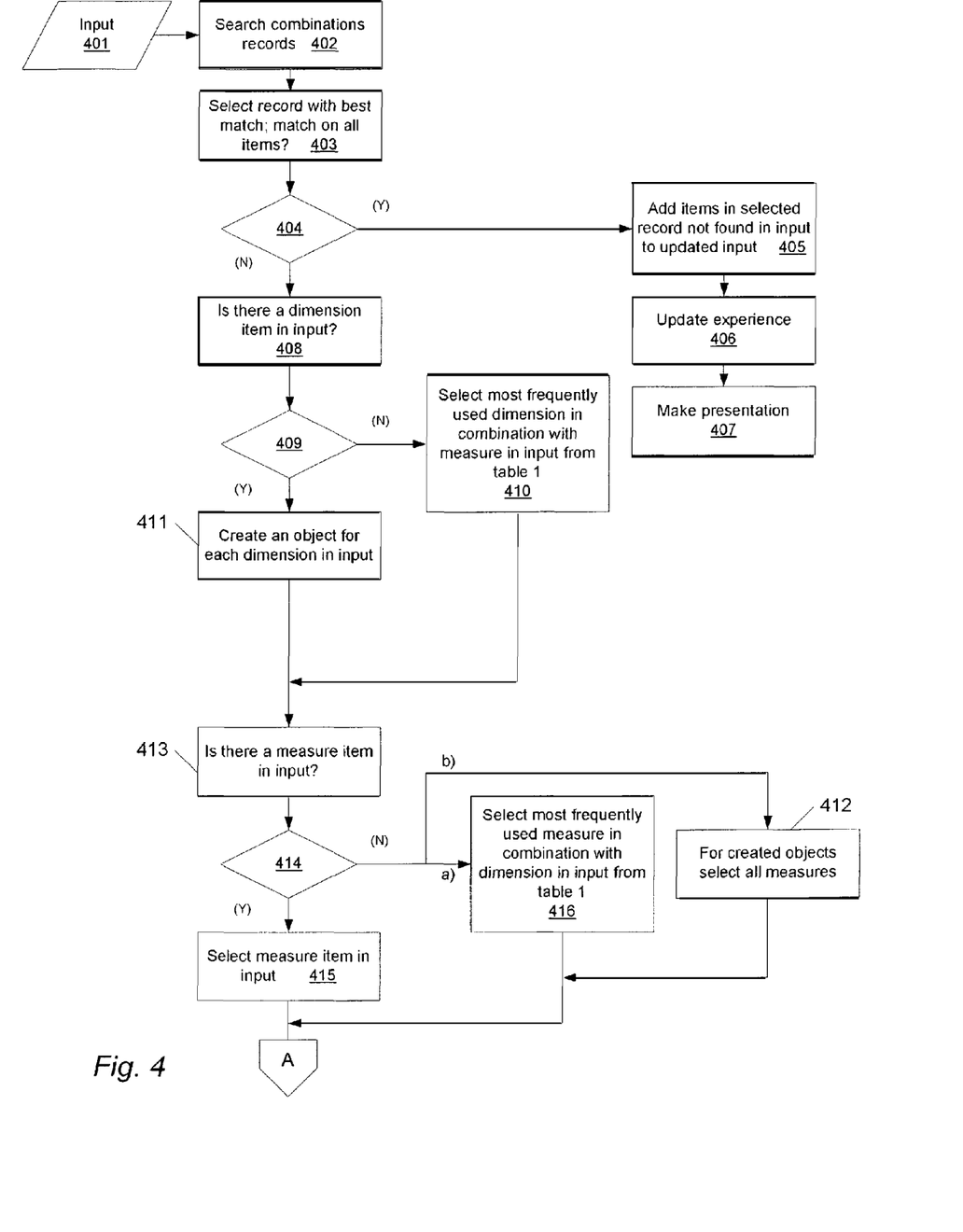
FIG. 4 shows a flowchart of a method according to the invention of determining an association.

FIG. 4 shows a flowchart of a method according to the invention of determining an association. This flowchart is an alternative and more detailed illustration of the process of determining data. Based on a question 401, a storage memory of combinations of presentation objects is searched to find presentation properties for previously used combinations of presentation objects; e.g. a combination of a pie chart and a bar chart object. The contents of the storage memory of combinations of objects can have the below exemplary form:

TABLE 2

| Combination | Frequency |
|---|---|
| Object1 = (Time Level 1; Turnover); | 3 |
| Object2 = (Country; Contribution Margin); | |
| Object3 = (Customer Level 0; Turnover; Cost; Contribution Margin); | |
| Criteria = (Time Level 1 = 2003 January) | |
| Object1 = (Time Level 0; Contribution Margin); | 2 |
| Object2 = (Customer Level 0; Turnover; Cost; Contribution Margin); | |
| Criteria = (Country = "United States"; Time Level 0 = 2003) | |
| Object1 = (Time Level 2; Turnover); | 3 |
| . | . |
| . | . |
| . | . |

Alternatively, this can be represented in XML format as shown below for the first record in table 2:

```
<object name="object1">
    <dimension name="Time Level 1"/>
    <measure name="Turnover"/>
</object>
<object name="Object2">
    <dimension name="Country"/>
    <measure name="Contribution Margin"/>
</object>
<object name="Object3">
    <dimension name="Customer Level 0"/>
    <measure name="Turnover"/>
    <measure name="Cost"/>
    <measure name="Contribution Margin"/>
</object>
<object name="Criteria">
    <dimension name="Time Level 1"/>
    <value name="2003 January"/>
</object>
```

As a result of the search, the record that is determined to have the best match with a record is selected temporarily and it is examined whether the temporarily selected record matches all items identified in the question. In case there is a match on all items (Y) it is determined in step 404 to continue to step 405, wherein properties of the temporarily selected record is applied to make a presentation in step 407. Before or after making the presentation in step 407, the frequency of use of the selected presentation is updated.

In case there is not a match on all items (N) it is determined in step 404 to continue to step 408, wherein it is examined whether a data item of the dimensions type was identified. Preferably, step 408 comprises selecting one, preferably a first, of several associations, if there are several associations. However, according to the invention, the method can resume to this step, in which case a next association is selected. In the positive event (Y) of step 408, an object for each identified dimension is created. This is based on the assumption that each dimension is to be presented by an individual object. In the event (N) that no dimension can be identified, the most frequently used dimension in association with an identified measure, if any, is selected. Thereby, if for instance a data item 'sale' is identified the method can select e.g. the data item 'time' if this is the most frequently used data item in association with 'sale'. Subsequently, an object for the selected data item of the dimensions type is created.

Preferably, the method continues to step 413 in which it is examined whether a data item of the measures type is identified. If, in step 414, it is decided that a measure item is identified (Y) the identified measure item is selected; alternatively (N) the most frequently used measure in association with the identified dimension is selected.

At this stage of the method, identified by the downward arrow with capital 'A', data items are selected and presentation objects have been created. If several associations are identified, the method can resume at step 408. Alternatively, the method can continue despite there are several associations to resume at step 408 from a later step.

Figure 5:
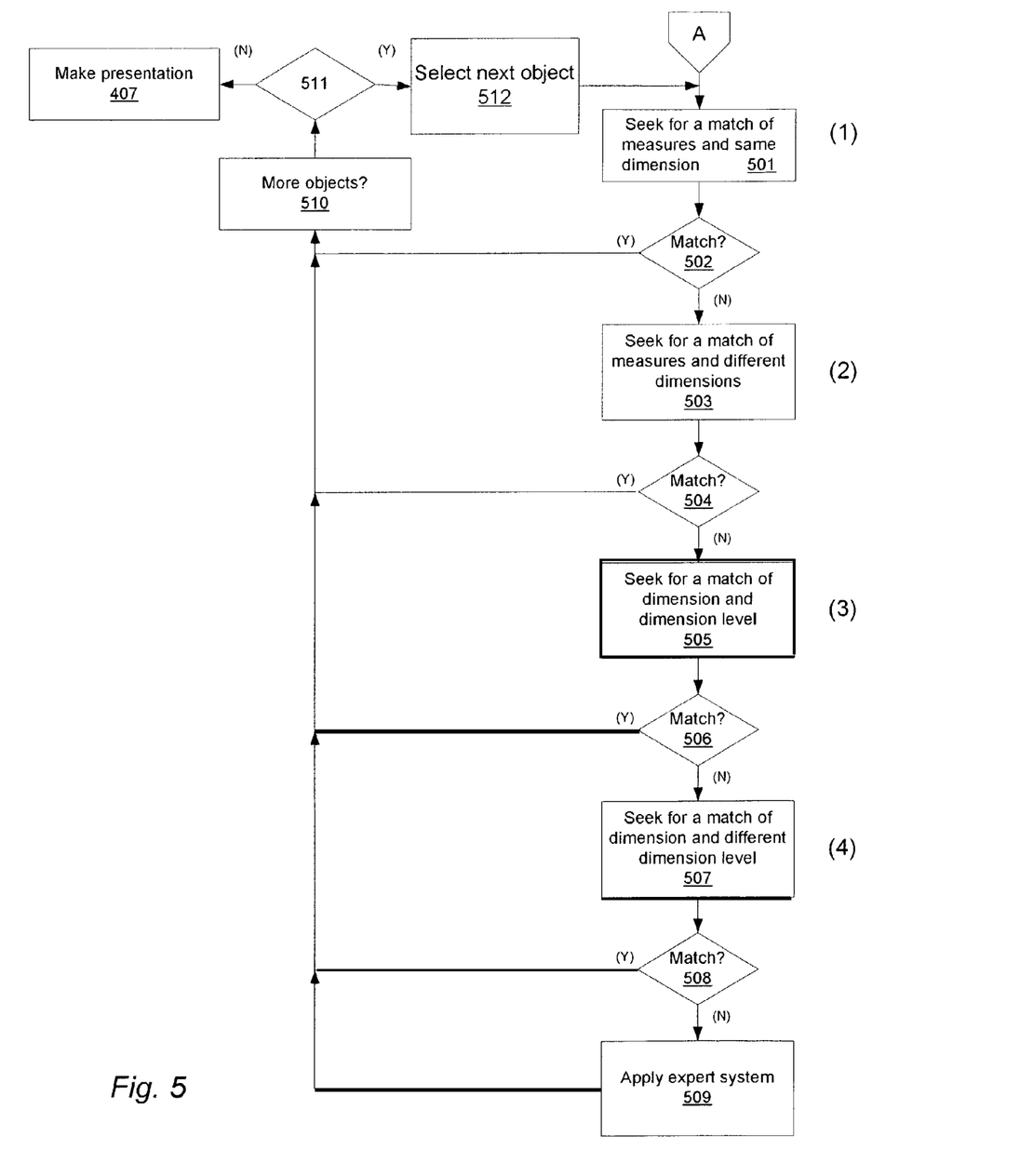
FIG. 5 shows a flowchart of a method according to the invention of determining a presentation.

FIG. 5 shows a flowchart of a method according to the invention of determining a presentation. The flowchart is entered at a stage identified by the downward arrow with capital 'A'. At this stage, data items are selected to form an association and presentation objects have been created. Thus, according to invention, presentation properties for a determined association can be determined by searching a storage for presentation properties of a previously stored, like association. In the event presentation properties of a previously stored, like association is found, the presentation properties can be applied to make a presentation of the data specified by the association.

At a first level of a layered search for presentation properties, the method comprises a step 501 of seeking a match of all data items of an association; and if a match is found (Y), step 502 directs the method to a next object. Alternatively (N), if no match is found, step 502 directs the method to a second level at which the method comprises a step 503 of seeking a match of an identified data item of the measures type only. Thereby, an associated data item of the dimensions type can be different from the identified data item of the dimensions type. If a match is found (Y), step 504 redirects the method to a next object. Alternatively (N), if no match is found, step 504 directs the method to a third level at which the method comprises a step 505 of seeking a match of data items of the dimensions type at same dimensions levels—for instance 'time, month' may match whereas 'time, day' consequently will not match. In the positive event, a match is found; step 506 directs the method to a next object. In the negative event, a match is not found; step 506 directs the method to a fourth level. At this fourth level the method comprises a step 507 of seeking a match of an identified data item of the dimensions type only. Thus, allowing the dimension level to be different. If a match is found (Y), step 508 redirects the method to a next object. Alternatively, it is deduced that no like presentation has been recorded and an expert system is applied in step 509 to select presentation properties based on e.g. constraints of the medium on which the presentation is to be produced and/or based on the structure and/or format of the data to be presented. The method is redirected to a next object from steps 502, or 504, or 506, or 508, or 509 via steps 510, 511 and 512. In case step 408 is resumed from a stage corresponding to transition 'A', step 512 of selecting a next object leads to step 501 if more objects were identified in step 510. Alternatively, if the method is not arranged to resume at step 408 from a stage corresponding to transition 'A', step 512 of selecting a next object is omitted and the flow is resumed at step 408 from step 511 in positive events (Y).

Thereby, a layered search is provided for resembling presentation properties, which to a largest possible extent conforms to a user's recorded preferences.

The expert system can be illustrated by pseudo-code of the following form, where BEGIN and END statements enclose the pseudo-code:

```
BEGIN
    If dimension is a time-dimension then
        Type=barchart; legend=off; labels=off; 3D
        effects=Orthogonal
    Else if one measure then
        Type=piechart; legend=on; labels=on; 3D-
        effects=Orthogonal
    Else
        Type=crosstab, legend=off; labels=off; 3D-
        effects=none
    Retrieve data from database
    If Type=piechart and number of dimension members is > 10 then
        Type=crosstab, legend=off; labels=off; 3D-
        effects=none
    If type not map and all dimension members are defined on map
    then
        Type=map, legend=off; labels=on; 3D-effects=none
    If labels overlapping then
        Labels=off
END
```

After the statement 'Retrieve data from database' it is possible to involve the structure and format of data to make decisions by means of the expert system.

The expert can be a type using linear logic programming, fuzzy logic or of any another type. Thus, the expert system can be implemented in various other ways than shown above.

To explain multidimensional databases, measures, dimensions, and levels one can imagine a spreadsheet whose rows represent products and columns represent months; these constitute two dimensions. In continuation thereof, it is possible to stack additional sheets (one for each sales office, say) that also have product and month rows. "Sales offices" thus becomes the third dimension.

A multidimensional database can multiple dimensions, representing, for example, different scenarios (e.g., budget versus actual) or customer categories. The data item to be measured across these dimensions is called a measure. In the above description of a preferred embodiment, e.g. 'sales' is a measure. A multidimensional database can have multiple measures. For example, it is possible to track both monetary income and units sold across the various dimensions. If a dimension consists of units that can be broken down into smaller units or grouped into larger ones, the relationship between unit levels is known as a hierarchy or simply 'levels'. Typical hierarchies are years broken down into levels of quarters and months, or sales offices grouped into regions. Many OLAP applications assign a single unit at the top hierarchical level of each dimension to represent the total for the entire dimension. Analysis tools then allow you to drill down into greater detail—for example, beginning with sales for the entire company, then by region, then by sales offices, and, finally, by individual salespersons.

Meta-data is descriptions of data items and can range from simple field names or table names to more advanced descriptions of the data comprising e.g. description of processes generating the data.

The invention claimed is:

1. A computer-implemented method of making a presentation of data requested by questions received via a user interface of a database, wherein:

the questions include respective sets of data items that are categorized as measures, which represent amounts, or categorized as dimensions, along which the measures can be arrayed, sets of data items in said questions include one data item of the measures categories, and another data item of the dimensions categories, and associations are combinations of related data items in the measures categories and data items in the dimensions categories, said associations specifying respective sets of data in the database that correspond to the combinations of data items, the method comprising the following steps:

parsing, from a question received from a user via the user interface, a first data item belonging to one of the measures categories and a second data item belonging to one of the dimensions categories;

determining a first association between the first data item belonging to the category of measures and the second data item belonging to the category of dimensions;

searching a plurality of stored associations in a data storage device to find a second association similar to the first association;

identifying presentation properties stored in said data storage device that correspond to the second association;

selecting presentation properties for the first association from the identified presentation properties corresponding to the second association, the selected presentation properties for the first association describing how to present the data items of the first association;

querying, based on the received question, the database to provide a set of result data corresponding to the set of the data items in the first association; and generating a presentation of the set of result data using the identified presentation properties.

2. The computer-implemented method according to claim 1, wherein:

in the event no first association is determined, searching the data storage device to detect a previously used association, if any, involving the data item; and in the event no previously used association involving the data item is found, creating an association involving the data item.

3. The method according to claim 1, wherein the method includes:

determining combinations of associations; and determining presentation properties by searching stored combinations of associations with assigned presentation properties.

4. The method according to claim 1, wherein the method includes:

determining whether a data item of the dimensions category or measures category is present in the question, and in the affirmative event, selecting a data item of the measures category or the dimensions category, respectively, to create the first association.

5. The method according to claim 4, wherein selecting a data item of the measures category or dimension category includes:

selecting from stored data items that can be associated with the determined data item in the question to create an association.

6. The method according to claim 4, wherein selecting a data item of the measures category or dimensions category includes:

selecting the data items that are determined to be the most frequently used data items of the dimensions category or measures category, respectively.

7. The method according to claim 4, wherein selecting a data item of the measures category includes:
selecting from stored data items that are determined to be the most frequently used data items in association with the determined data item in the question.

8. The method according to claim 1, characterized in that the determined associations of data items that are applied with the presentation properties to make a presentation are registered with a count that represents a frequency of use.

9. The method according to claim 1, comprising: creating a memory object for each determined data item of the dimensions type.

10. The method according to claim 1, wherein identifying presentation properties comprises:
a layered search for presentation properties.

11. The method according to claim 10, characterized in that the layered search comprises:
a first level with a search for a match of measures and same dimensions.

12. The method according to claim 10, wherein the layered search comprises:
a second level with a search for a match of measures and different dimensions.

13. The method according to claim 10, wherein the layered search comprises:
a third level with a search for a match of dimension at primarily same level of dimension or secondarily at a different level of dimension.

14. The method according to claim 1, comprising:
applying an expert system, arranged to determine and apply presentation properties, in the event no like association is found.

15. A computer program comprised of instructions stored in a computer-readable medium that, when executed by a computer, perform the method set forth in claim 1.

16. A user-interface arranged to make a presentation of data requested by questions received via an input box on the user interface, the user-interface being connected to a database, wherein:
said questions include data items that are categorized as measures representing amounts or dimensions along which measures can be arrayed, and
associations are combinations of related data items in the measures and dimensions categories, said associations specifying respective sets of data in the database that correspond to the combinations of data items,
the user-interface comprising:
a parser arranged to parse a question received from a user via the user interface of the database, and determine an association between a dimension data item and a measure data item; and
a creator arranged to create an association if no association is found in the question;
a search engine arranged to search for presentation properties of reference associations stored in a data storage device; and
presentation means for, if presentation properties are found, applying the presentation properties to make a presentation of data specified by the association.

17. A computer-implemented method of making a presentation of data requested by questions received via a user interface of a database, wherein:
the questions include data items categorized as measures representing amounts or dimensions along which measures can be arrayed,
an association is comprised of a combination of related data item of the measures category and a data item of the dimensions category; and
an association specifies a set of data in the database that correspond to the combination of data items,
the method comprising:
parsing a question received from a user via the user interface of the database;
detecting at least one data item belonging to the dimensions category or the measures category;
searching for reference presentation properties of association stored in a data storage device that comprises the at least one detected data item;
determining whether presentation properties are found; and
generating a presentation of data specified by the association using the found presentation properties.

18. A computer-implemented method of generating a presentation of data retrieved from a database based on questions received from users, wherein:
the questions include data items belonging to measures categories, which represent amounts, or dimensions categories, along which the amounts can be arrayed, and
associations are combinations of related data items in the measures categories and data items in the dimensions categories, said
associations specifying respective sets of data in the database that correspond to the combinations of data items,
the method comprising:
parsing, from a question received from a user via a computer-user interface of the database, a first data item belonging to one of the measures categories and a second data item belonging to one of the dimensions categories;
determining a first association between the first data item and the second data item;
retrieving a second association from a data storage having a plurality of stored associations based on a similarity of the second association to the first association;
identifying presentation properties stored in said data storage device that correspond to the second association;
selecting presentation properties for the first association from among the identified presentation properties corresponding to the second association, the selected presentation properties for the first association describing how to present the data items of the first association;
querying the database to retrieve a set of result data corresponding to the data items in the first association; and
generating a presentation of the set of result data using the identified presentation properties on the computer-user interface.

* * * * *